US009521024B2

(12) United States Patent
Wang (10) Patent No.: US 9,521,024 B2
(45) Date of Patent: Dec. 13, 2016

(54) DEVICE OF CREST FACTOR REDUCTION

(71) Applicant: Telefonaktiebolaget L M Ericsson (publ), Stockholm (SE)

(72) Inventor: Yunfei Wang, Sichuan (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/775,974

(22) PCT Filed: Mar. 18, 2013

(86) PCT No.: PCT/CN2013/072820
§ 371 (c)(1),
(2) Date: Sep. 14, 2015

(87) PCT Pub. No.: WO2014/146235
PCT Pub. Date: Sep. 25, 2014

(65) Prior Publication Data
US 2016/0028574 A1      Jan. 28, 2016

(51) Int. Cl.
*H04L 25/49*   (2006.01)
*H04L 27/26*   (2006.01)
*H04L 27/36*   (2006.01)

(52) U.S. Cl.
CPC ......... *H04L 27/2624* (2013.01); *H04L 27/367* (2013.01)

(58) Field of Classification Search
CPC ................. H04L 27/2624; H04L 27/367
See application file for complete search history.

(56) References Cited

U.S. PATENT DOCUMENTS 7,313,373 B1 * 12/2007 Laskharian ............ H04B 1/04
                                                        455/127.1
8,649,471 B1 *  2/2014 Charbonneau ...... H04L 27/2624
                                                        341/132

(Continued)

FOREIGN PATENT DOCUMENTS

| CN | 201188635 Y | 1/2009 |
|---|---|---|
| CN | 102223338 A | 10/2011 |
| WO | WO 2004/019540 A2 | 3/2004 |

OTHER PUBLICATIONS

PCT Notification of Transmittal of the International Search Report and the Written Opinion of the International Searching Authority, or the Declaration for International application No. PCT/CN2013/072820, Jan. 2, 2014.

(Continued)

*Primary Examiner* — Syed Haider
(74) *Attorney, Agent, or Firm* — Baker Botts, LLP (57) ABSTRACT

The present disclosure provides a device (300) of crest factor reduction for a multi-carrier signal. The device (300) includes: a peak detector (320) adapted to receive a sampled representation of the multi-carrier signal, detect a peak from the sampled representation and obtain a value and a time domain location of a cancellation peak for cancelling the peak; a plurality of peak cancellation signal generators (330) each corresponding to a carrier of the multi-carrier signal and adapted to generate a peak cancellation signal within a frequency band of its corresponding carrier based on the value and time domain location of the cancellation peak; and a subtractor (350) adapted to subtract the peak cancellation signals from the sampled representation after being delayed. The present disclosure also provides another device of crest factor reduction, a multi-stage crest factor reduction circuit and a peak detector.

13 Claims, 4 Drawing Sheets

(56) References Cited

U.S. PATENT DOCUMENTS

| | | | | |
|---|---|---|---|---|
| 2004/0052314 A1* | 3/2004 | Copeland | H04B 1/707 | 375/296 |
| 2006/0014500 A1* | 1/2006 | Marsili | H04B 1/0475 | 455/115.1 |
| 2006/0176969 A1* | 8/2006 | Trivedi | H04L 27/2614 | 375/260 |
| 2007/0121736 A1* | 5/2007 | Clausen | H04L 27/2618 | 375/260 |
| 2008/0292010 A1* | 11/2008 | Wernears | H04L 27/2614 | 375/260 |
| 2012/0093209 A1* | 4/2012 | Schmidt | H04L 27/2624 | 375/224 |
| 2013/0251055 A1* | 9/2013 | Yu | H04L 5/0007 | 375/260 |
| 2014/0044215 A1* | 2/2014 | Mundarath | H04L 27/2624 | 375/297 |

OTHER PUBLICATIONS

IEEE Communications Letters, vol. 2, No. 5; Effects of Clipping and Filtering on the Performance of OFDM by Xiaodong Li et al., May 1998.

Xilinx; XAPP1033 (v1.0); Peak Cancellation Crest Factor Reduction Reference Design by Ed Hemphill et al., Nov. 18, 2007.

\* cited by examiner

DEVICE OF CREST FACTOR REDUCTION

PRIORITY

This nonprovisional application is a U.S. National Stage Filing under 35 U.S.C. §371 of International Patent Application Serial No. PCT/CN2013/072820, filed Mar. 18, 2013, and entitled "DEVICE OF CREST FACTOR REDUCTION."

TECHNICAL FIELD

The present invention relates to signal processing technology, and more particularly, to a device of Crest Factor Reduction (CFR).

BACKGROUND

Peak to Average Power Ratio (PAPR) is one of the most critical problems in an Orthogonal Frequency Division Multiplexing (OFDM) system. In a radio front end, a high PAPR may lead to serious back-off and thus a low efficiency of a power amplifier (PA). To reduce the PAPR of an OFDM signal, a number of Crest Factor Reduction (CFR) techniques have been proposed. They can be classified into two categories, coding based CFR and clipping based CFR. The coding based CFR techniques cause no signal distortion, but have high computational complexity and low spectrum efficiency. When one Remote Radio Unit (RRU) is connected to multiple Digital Units (DUs), the coding based CFR techniques are not applicable and therefore only the clipping based techniques can be considered. The clipping based CFR techniques solve a problem that can be represented as: given an input signal, how to obtain an output signal with the lowest PAPR while satisfying requirements of Error Vector Magnitude (EVM) and Adjacent Channel Leakage Ratio (ACLR).

Figure 1:
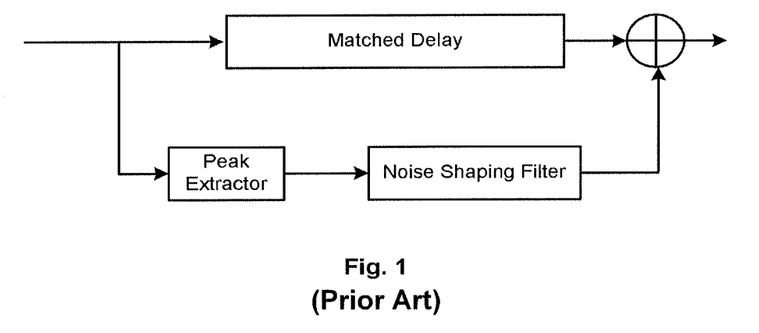
FIG. 1 is a block diagram of a conventional NS-CFR device.

Noise Shaping (NS)-CFR (see X. Li, L. J. Cimini Jr, "Effects of Clipping and Filtering on the Performance of OFDM" in Proc. of Vehicular Technology Conference, IEEE, pp. 1634, 1997) is one of the most popular clipping based CFR algorithms. As shown in FIG. 1, a NS-CFR device extracts, from an input signal, a signal sample which exceeds a certain threshold and shapes it using a noise shaping filtering to obtain a shaped noise signal. Then, the shaped noise signal is subtracted from the original input signal.

For a better PAPR performance, a cascaded clipping scheme can be applied. Normally, four to six CFR stages are needed. The complexity of a NS-CFR device is mainly caused by the noise shaping filter. To reduce the complexity, a carrier de-combiner (including carrier transposing and down-sampling functions) can be provided following the NS-CFR device. An up-sampler may also be needed (see H. Chen and A. M. Haimovich, "Iterative estimation and cancellation of clipping noise for OFDM signals," IEEE Commun. Lett., vol. 7, no. 7, pp. 305-307, July 2003).

Figure 2:
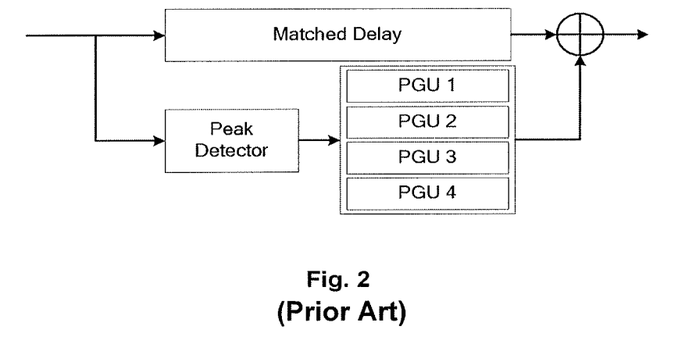
FIG. 2 is a block diagram of a conventional PC-CFR device.

Most samples of the noise signal in the NS-CFR algorithm are zeros. To improve the efficiency, a Peak Cancellation (PC)-CFR (see E. Hemphill, S. Summerfield, G. Wang, and D. Hawke, "Peak Cancellation Crest Factor Reduction Reference Design", XAPP1033 (V1.0), Xilinx, Nov. 18, 2007) algorithm has been proposed. FIG. 2 shows a structure of a typical PC-CFR device. When a peak is detected from an input signal by a peak detector, the PC-CFR device allocates the peak to a peak generation unit (PGU) which then generates a pre-shaped and scaled cancellation peak to be subtracted from the input signal after being subjected to a matched delay. Since peaks are sparse in time, a small number of PGUs are generally sufficient to fulfill the clipping task. However, since the number of PGUs is limited, it is always possible that, when all PGUs are occupied, a new coming peak will be missed. This will lead to a problem of peak leakage and create a high risk for a PA. This problem can be mitigated by a cascaded clipping scheme. A typical implementation of PC-CFR has two to four clipping stages.

Compared with the PC-CFR algorithm, the complexity of the NS-CFR algorithm is higher while the required PAPR is not very low. However, the NS-CFR can guarantee that all peaks are eliminated. On the other hand, the PC-CFR is efficient in canceling high peaks with low EVM and ACLR costs, but its peak leakage is a fatal problem. That is, both algorithms have their own advantages and disadvantages. Thus, there is need for a CFR structure that can utilize the advantages of both CFR algorithms to obtain an improved performance in terms of PAPR, EVM and ACLR.

In Long Term Evolution (LTE) systems, the CFR techniques face a new challenge from increased information bandwidth and increased number of carriers. For a multi-carrier signal such as an OFDM signal, its PAPR increases with the increase of its bandwidth. The performance of the CFR algorithm highly depends on the sampling rate of the input signal. The sampling rate, and thus the complexity, will increase with the increase of the signal bandwidth. For example, if the signal bandwidth doubles, the complexity of the CFR algorithm increases by at least a factor of 2. The complexity of the CFR algorithm also increases with the increase of the number of carriers of the signal. Thus, a CFR algorithm or structure with low complexity is highly desired especially for a multi-carrier signal.

Additionally, as noted above, the peak leakage is a serious defect of the PC-CFR algorithm, especially for high peaks. If a high peak is leaked, the PAPR performance will be severely degraded. Therefore, it is desired that, if the peak leakage is inevitable due to limited number of PGUs in a PC-CFR device, the probability of high peak leakage can be minimized.

SUMMARY

It is an object of the present invention to solve at least one of the above problems in the prior art.

According to a first aspect of the present invention, a device of crest factor reduction for a multi-carrier signal is provided. The device includes: a peak detector adapted to receive a sampled representation of the multi-carrier signal, detect a peak from the sampled representation and obtain a value and a time domain location of a cancellation peak for cancelling the peak; a plurality of peak cancellation signal generators each corresponding to a carrier of the multi-carrier signal and adapted to generate a peak cancellation signal within a frequency band of its corresponding carrier based on the value and time domain location of the cancellation peak; and a subtractor adapted to subtract the peak cancellation signals from the sampled representation after being delayed.

With the first aspect of the present invention, a plurality of peak cancellation signal generators are provided. Each of the peak cancellation signal generators corresponds to a carrier of the multi-carrier signal and generates a peak cancellation signal within a frequency band of its corresponding carrier. In this way, a CFR device for a multi-carrier signal can be implemented at a low complexity.

According to a second aspect of the present invention, a device of crest factor reduction is provided. The device includes: a peak detector adapted to receive a sampled representation of a signal, detect a peak from the sampled representation and obtain a value and a time domain location of a cancellation peak for cancelling the peak; an allocator adapted to allocate the cancellation peak to a peak generation unit; a plurality of peak generation units each adapted to, if allocated with the cancellation peak, adjust the phase of the cancellation peak to obtain the phase adjusted value of the cancellation peak and generate an intermediary signal based on the phase adjusted value and the time domain location of the cancellation peak; an adder adapted to sum up intermediary signals generated by the plurality of peak generation units to obtain a sum signal; a mixer adapted to up-convert the sum signal to a carrier frequency of the signal to generate a peak cancellation signal; and a subtractor adapted to subtract the peak cancellation signal from the sampled representation after being delayed. The sampled representation here is obtained by sampling the signal at a sampling frequency and over-sampling the sampled signal at an over-sampling frequency. The phase of the cancellation peak is adjusted to compensate for a phase offset introduced by the mixer.

With the second aspect of the present invention, a peak is detected from the over-sampled signal and thus the detected location of the peak can be more accurate. That is, the accuracy of peak detection can be improved.

According to a third aspect of the present invention, a multi-stage crest factor reduction circuit is provided. The multi-stage crest factor reduction circuit includes at least: a first crest factor reduction stage with a first filter length; a second crest factor reduction stage with a second filter length shorter than the first filter length; and a third crest factor reduction stage with a third filter length shorter than the second filter length. Here, at least one of the first, second and third crest factor reduction stages is formed by the device according to any one of the above first and second aspects.

With the third aspect of the present invention, each stage has a different filter length and has a different role from the other stages. Thus, it is possible to combine the advantages of the NS-CFR and PC-CFR algorithms with high efficiency and low complexity.

According to a fourth aspect of the present invention, a peak detector is provided. The peak detector detects one or more peaks to be canceled by a plurality of peak generation units. The peak detector includes: a resource calculation unit adapted to calculate a resource occupation state of each of the plurality of peak generation units; a peak detection unit adapted to detect, from a sampled representation of a signal, samples each having a magnitude larger than a first threshold as a set of candidate peaks; a high peak extraction unit adapted to extract, from the set of candidate peaks, a high peak having a magnitude larger than a second threshold, the second threshold being larger than the first threshold, and determine the high peak as a peak to be canceled if the resource occupation state of at least one of the plurality of peak generation units indicates that the at least one peak generation unit is currently idle; a delay unit adapted to delay the high peak determined as a peak to be canceled by a time length required for processing a peak; a peak modification and delay unit adapted to remove the high peak determined as a peak to be canceled from the set of candidate peaks to obtain a set of low peaks and delay the set of low peaks by the time length; and a low peak extraction unit adapted to extract a low peak from the set of low peaks in a temporal order, determine the low peak as a peak to be canceled if the resource occupation state of at least one of the plurality of peak generation units indicates that the at least one peak generation unit has been idle for at least the time length, and output the value and the time domain location of each peak determined as a peak to be canceled by both the high and low peak extraction units.

With the third aspect of the present invention, a high peak is determined as a peak to be canceled if at least one peak generation unit is currently idle, whereas a low peak is determined as a peak to be canceled if at least one peak generation unit has been idle for at least the time length required for processing a peak. Thus, the probability of high peak leakage can be minimized, even if the peak leakage is inevitable due to limited number of PGUs in a PC-CFR device.

BRIEF DESCRIPTION OF THE DRAWINGS

The above and other objects, features and advantages will be more apparent from the following description of embodiments with reference to the figures, in which.

DETAILED DESCRIPTION OF EMBODIMENTS

The embodiments of the present invention will be detailed below with reference to the drawings. It should be noted that the following embodiments are illustrative only, rather than limiting the scope of the present invention.

Figure 3:
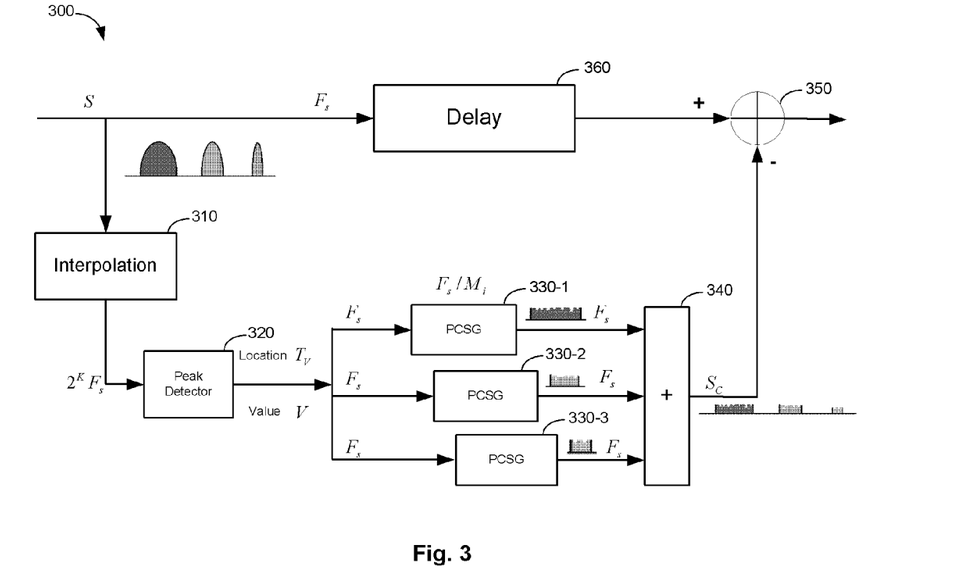
FIG. 3 is a block diagram of a CFR device according to an embodiment of the present invention.

FIG. 3 is a block diagram of a CFR device 300 for a multi-carrier signal according to an embodiment of the present invention. It is assumed that the multi-carrier signal has R carriers centered at frequencies $f_1, f_2 \ldots f_R$ and having bandwidths $BW_1, BW_2 \ldots BW_R$, respectively. The carrier configuration here may be different from that of a conventional carrier combiner, since some contiguous carriers may be aggregated and treated as one carrier. In FIG. 3, it is assumed that R=3, i.e., the multi-carrier signal has three carriers, each of which can be an aggregated carrier.

As shown in FIG. 3, the CFR device 300 includes a peak detector 320. The peak detector 320 receives a sampled representation of the multi-carrier signal, detects a peak from the sampled representation and obtains a value V and a time domain location $T_V$ of a cancellation peak for cancelling the peak. Here, the sampled representation can be obtained by sampling the multi-carrier signal at a sampling frequency $F_s$ (i.e., the sampling period $T=1/F_s$.). The system clock frequency can also be $F_s$, which is the unique system clock used in the CFR device. In FIG. 3, the input signal, S, is a signal obtained by sampling the multi-carrier signal at the sampling frequency $F_s$.

Optionally, the CFR device includes an interpolation unit 310 for interpolating (i.e., over-sampling) the input signal S at an over-sampling frequency $2^K F_s$, where K is a positive integer. In this case, the sampled representation input to the peak detector 320 is the over-sampled signal and the time domain location obtained by the peak detector has a resolution of $1/(2^K F_s)$. Thus, the detected location of the peak can be more accurate. More generally, K being zero implies the omission of the optional over-sampling process.

The CFR device 300 also includes a plurality of peak cancellation signal generators (PCSGs) each corresponding to a carrier of the multi-carrier signal and adapted to generate a peak cancellation signal within a frequency band of its corresponding carrier based on the value and time domain location of the cancellation peak. In the example shown in FIG. 3, there are three PCSGs 330-1, 330-2 and 330-3 (which can be collectively referred to as PCSGs 330 as appropriate) each corresponding to one of the three carriers. Further details of the PCSGs will be given later.

The CFR device 300 further includes a subtractor 350 adapted to subtract the peak cancellation signals from the sampled representation after being delayed by the delay unit (360). Optionally, an adder 340 can be provided to sum up the peak cancellation signals generated by the PCSGs and output the sum of the peak cancellation signals to the subtractor 350.

Figure 4:
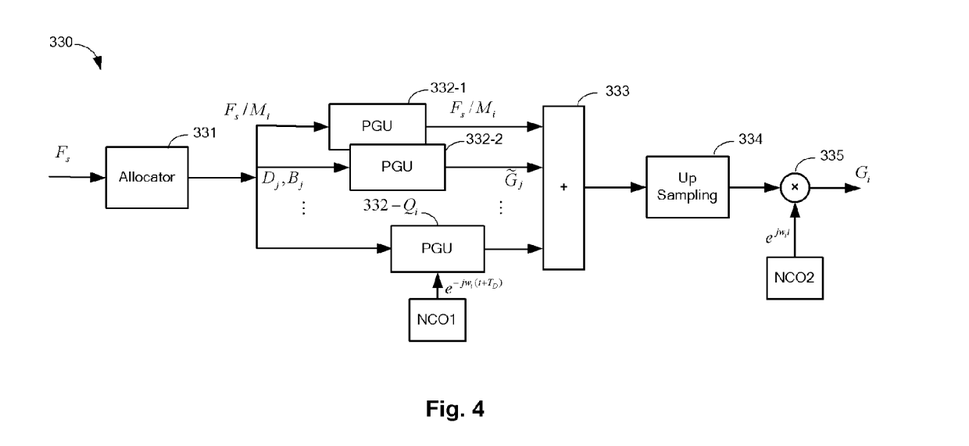
FIG. 4 is a block diagram of one of the peak cancellation signal generators shown in FIG. 3.

FIG. 4 is a block diagram of one of the PCSGs 330 shown in FIG. 3. The PCSGs 330 may have the same configuration.

As shown in FIG. 4, a PCSG 330 includes an allocator 331 and a plurality of peak generation units (PGUs) 332-1, 332-2, ... (which can be collectively referred to as PGUs 332 as appropriate). The allocator 331 receives the value V and time domain location $T_V$ of the cancellation peak obtained by the peak detector 320 (see FIG. 3) and allocates the cancellation peak to one of the PGUs 332. The PGU allocated with the cancellation peak adjusts the phase of the cancellation peak to obtain the phase adjusted value of the cancellation peak and generates an intermediary signal based on the phase adjusted value and the time domain location of the cancellation peak.

The PCSG 330 also includes an adder 333 adapted to sum up intermediary signals generated by the plurality of PGUs 332 to obtain a sum signal and a mixer 335 adapted to up-convert the sum signal to the carrier corresponding to the PCSG 330 to generate the peak cancellation signal. In the PGU, the phase of the cancellation peak is adjusted to compensate for a phase offset introduced by the mixer.

In an embodiment, each of the PGUs 332 operates at a frequency of $F_s/M$, where M is positive integer dependent on the bandwidth of the carrier corresponding to the PCSG. As an example, for a carrier with a smaller bandwidth, a larger value of M can be used.

In an embodiment, the PCSG 330 further includes an up-sampler 334 adapted to up-sample the sum signal to Fs. In this case, the mixer 335 is adapted to up-convert the up-sampled sum signal to the carrier corresponding to the PCSG to generate the peak cancellation signal.

Mathematically, the operation of the i-th (i=1, ..., R) PCSG 330-i corresponding to the i-th carrier of the multi-carrier signal can be described as follows.

It is assumed that there are $Q_i$ PGUs 332 each operating at the frequency of $F_s/M_i$, which means only one sample is generated every $M_i$ clock cycles. Preferably, $M_i$ is a non-negative integer power of 2 and is configurable. Therefore, the resources can be shared, and then only $Q_i/M_i$ PGUs need to be implemented physically. Each PGU 332 contains two complex multipliers and two complex adders.

The allocator 331 allocates a cancellation peak (represented by $T_V$ and V) to one of the PGUs 332. It can be ensured that there is at least one idle PGU while a cancellation peak is allocated to the PCSG. It is assumed that the cancellation peak is allocated to the j-th PGU, then the input to the PGU can be represented as $D_j=V$ and $B_j=T_V*2^K F_S$ mod $2^K M_i$ which represents the fractional time location of the cancellation peak in the sampling period $T_s$.

If $D_j \neq 0$, the PGU enters a operating state and operates, as follows. First, the phase adjusted value of $D_j$ is calculated as $D_j'=D_j e^{-jw_i(T_V+T_D)}$, where $T_D$ is system parameter representing a time distance between $T_V$ and the time location of the corresponding cancellation peak. Then, an elementary signal $h_{B_j}(t)$ is read from a pre-stored table and multiplied by $D_j'$ to obtain an intermediary signal $\tilde{G}_j(T_V+T_D+t)=D_j'h_{B_j}(t)$ at the frequency of $F_S/M_i$, where $h_m(t)$, m=1, 2, ..., $M_i$ is a set of Finite Impulse Response (FIR) filter coefficients with limited bandwidth, $$-\frac{T_{hi}}{2} \leq t \leq \frac{T_{hi}}{2} \text{ and } T_{hi}$$

denotes the length of the FIR filter. The time required for the PGU to process a cancellation peak is $T_{Li}$. Then the PGU return to idle state. There are $M_i$ elementary peak cancelling signals $h_m(t)$, m=1, 2, ..., $M_i$ for the i-th PCSG, which are pre-stored in a table and can be configured by software. Here, $h_m(t)$ is a finite signal which is limited to $$-\frac{T_{hi}}{2} \leq t \leq \frac{T_{hi}}{2}$$

and has a sampling frequency of $F_S/M_i$. Each $h_m(t)$, m=1, 2, ..., $M_i$ has the same bandwidth but different fractional delay.

Then, the intermediary signals $\tilde{G}_j$, j=1, ..., $Q_i$ generated by all of the PGUs are then added, up-sampled to $F_S$ and up-converted to the i-th carrier to finally obtain the peak cancellation signal $G_i$.

In FIG. 4, the mixer 335 includes an oscillator NCO2 for generating a complex signal $e^{jw_i t}$ at the frequency of $F_S$ to up-convert the up-sampled signal to the i-th carrier, where $w_i$ is the center frequency of the i-th carrier. Each PGU includes an oscillator NCO1 for generating a complex signal $e^{-jw_i(t+T_D)}$ at the frequency of $2^K F_S$ to compensate the phase offset introduced by the NCO2.

According to the above embodiment, a CFR device for a multi-carrier signal can be implemented at a low complexity. Further, with the above CFR device, peaks can be detected at a high sampling rate and cancelled at a low sampling rate. In this way, the peak detection accuracy can be improved and the resources required for achieving an equivalent performance can be reduced.

Figure 5:
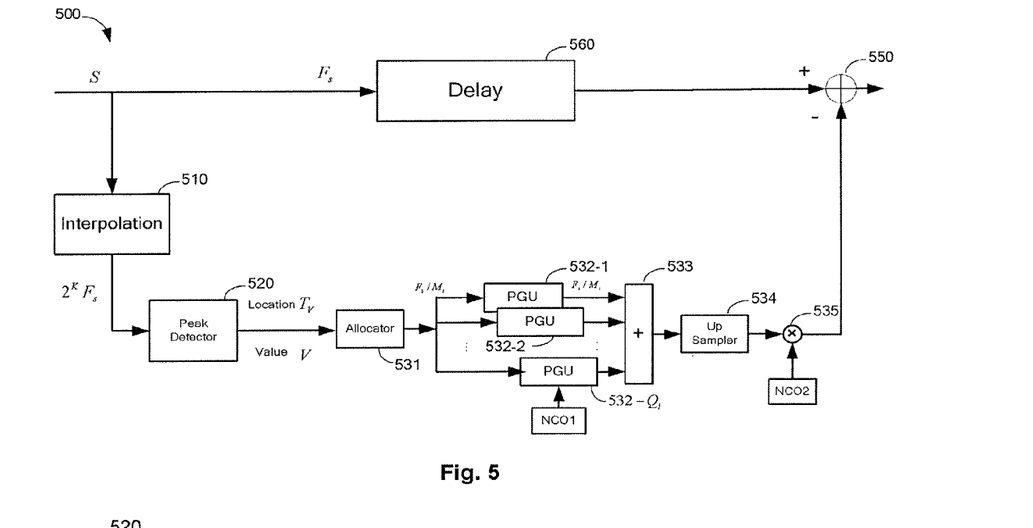
FIG. 5 is a block diagram of a CFR device according to another embodiment of the present invention.

The above principle of the present invention is not limited to a multi-carrier signal, but also applicable for a single carrier signal. FIG. 5 is a block diagram of a CFR device 500 according to another embodiment of the present invention. The structure shown in FIG. 5 is substantially the same as that of FIG. 3, except that there is only one PCSG (for only one carrier). The functions of the units 510, 520, 531, 532, 533, 534, 535, 550 and 560 shown in FIG. 5 are substantially the same as those of the units 310, 320, 331, 332, 333, 334, 335, 350 and 360 shown in FIGS. 3 and 4, respectively.

As shown in FIG. 5, the CFR device 500 includes: a peak detector 520 adapted to receive a sampled representation of a signal, detect a peak from the sampled representation and obtain a value and a time domain location of a cancellation peak for cancelling the peak; an allocator 531 is adapted to allocate the cancellation peak to a peak generation unit; a plurality of peak generation units 532 each adapted to, if allocated with the cancellation peak, adjust the phase of the cancellation peak to obtain the phase adjusted value of the cancellation peak and generate an intermediary signal based on the phase adjusted value and the time domain location of the cancellation peak; an adder 533 adapted to sum up intermediary signals generated by the plurality of peak generation units to obtain a sum signal; a mixer 535 adapted to up-convert the sum signal to a carrier frequency of the signal to generate a peak cancellation signal; and a subtractor 550 adapted to subtract the peak cancellation signal from the sampled representation after being delayed by the delay unit 560. Here, the sampled representation is obtained by sampling the signal at a sampling frequency and over-sampling (by the interpolation unit 510) the sampled signal at an over-sampling frequency. The phase of the cancellation peak is adjusted to compensate for a phase offset introduced by the mixer 535.

Alternatively, the sampling frequency is $F_s$ and each of the plurality of peak generation units 532 operates at a frequency of $F_s/M$, where M is positive integer dependent on the bandwidth of the signal.

In an embodiment, the CFR device 500 further includes an up-sampler 534 adapted to up-sample the sum signal to Fs. In this case, the mixer is adapted to up-convert the up-sampled sum signal to generate the peak cancellation signal.

Preferably, the peak detector 520 is adapted to detect, as the peak, any sample from the sampled representation which has a magnitude larger than a first threshold while giving priority to any sample having a magnitude larger than a second threshold, the second threshold being larger than the first threshold.

Figure 6:
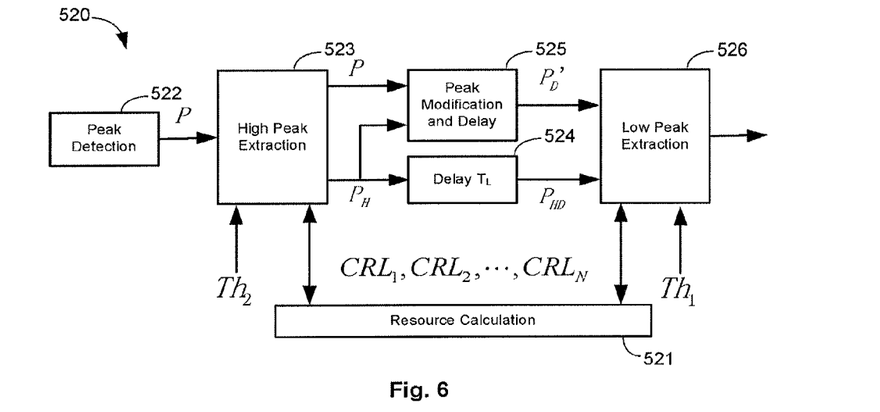
FIG. 6 is a block diagram of a peak detector according to an embodiment of the present invention.

In particular, referring to FIG. 6 which is a block diagram of a peak detector 520 according to an embodiment of the present invention, the peak detector includes: a resource calculation unit 521, a peak detection unit 522, a high peak extraction unit 523, a delay unit 524, a peak modification and delay unit 525 and a low peak extraction unit 526.

The resource calculation unit 521 calculates a resource occupation state of each of the plurality of peak generation units 532 (see FIG. 5).

The peak detection unit 522 detects, from the sampled representation, samples each having a magnitude larger than the first threshold as a set of candidate peaks.

The high peak extraction unit 523 extracts, from the set of candidate peaks, a high peak having a magnitude larger than the second threshold and determines the high peak as a peak to be canceled if the resource occupation state of at least one of the plurality of peak generation units indicates that the at least one peak generation unit is currently idle.

The delay unit 524 delays the high peak determined as a peak to be canceled by a time length required for processing a peak.

The peak modification and delay unit 525 removes the high peak determined as a peak to be canceled from the set of candidate peaks to obtain a set of low peaks and delay the set of low peaks by the time length.

The low peak extraction unit 526 extracts a low peak from the set of low peaks in a temporal order, determines the low peak as a peak to be canceled if the resource occupation state of at least one of the plurality of peak generation units indicates that the at least one peak generation unit has been idle for at least the time length, and outputs a value and a time domain location of each peak determined as a peak to be canceled by both the high and low peak extraction units.

In general, the peak detector 520 is designed to find the location $T_V$ satisfying:

(1) $|S'(T_V)|>Th_1$, $|S'(T_V)|>|S'(T_V-T_s')|$, $|S'(T_V)|\geq|S'(T_V+T_s')|$, where S' is the signal obtained by over-sampling the signal S at the sampling frequency of $2^K F_s$, S'(t) is the value of S' at the time instance t, $Th_1$ is the first threshold as described above, and $T_s'=1/(2^K F_s)$.

(2) The distance between two adjacent peaks should be no less than $T_I$, i.e., $T_I$ is the minimum interval between two peaks.

(3) There can be at most N peaks in any $T_L$ time span, where N is the number of PGUs and $T_L$ is the time required for a PGU to process a peak.

Next, the functions of the respective units of the peak detector will be explained in further detail.

Due to the processing capacity limit (N), it is possible that some peak satisfying the above conditions (1) and (2) cannot be processed. To reduce the possibility of leaking a high peak, any high peak satisfying $S'(T_V)>Th_2$ is given higher priority than any peak satisfying $Th_2>S'(T_V)>Th_1$, where $Th_2$ is the second threshold as described above.

The peak detection unit 522 detects a set of peaks P satisfying the above condition (1).

The resource calculation unit 521 contains N counters, $CRL_1, CRL_2, \ldots, CRL_N$, corresponding to the N PGUs, respectively. Each counter is initialized to be a minimal value RC_MIN, which is smaller than $-T_L$. The value of each counter is reduced by $T_s$ every $T_s$, until it reaches the minimal value RC_MIN.

The high peak extraction unit 523 extracts a high peak $P_H$ satisfying $P_H>Th_2$ and the above conditions satisfying (2) and (3).

If the value of the counter $CRL_u$ (u=1, . . . , N) is currently equal to or smaller than 0, which indicates that the corresponding u-th PGU is currently idle, the high peak extraction unit determines the high peak as a peak to be canceled by the u-th PGU and set the value of the counter $CRL_u$ to $T_L$. It is assumed here that the u-th PGU is currently idle and the high peak $P_H$ is determined as a peak to be canceled.

The delay unit 524 delays the high peak $P_H$ by $T_L$ to obtain a delayed high peak $P_{HD}$.

The peak modification and delay unit 525 removes the high peak $P_H$ from P to obtain a set of low peaks P' and delays P' by $T_L$ to obtain $P_D'$.

The low peak extraction unit 526 extracts a low peak $P_L$ from $P_D'$ in a temporal order. If the value of the counter $CRL_v$ (v=1, . . . , N) is currently equal to or smaller than $-T_L$, which indicates that the corresponding v-th PGU has been idle for at least $T_L$, the low peak extraction unit determines the low peak $P_L$ as a peak to be canceled by the v-th PGU and set the value of the counter $CRL_v$ to 0.

The low peak extraction unit 526 then combines the peaks determined as peaks to be canceled by both the high and low peak extraction units and outputs them to the PGUs.

In this way, a low peak can be cancelled only if its cancellation will not affect the cancellation of any potential high peak. Thus, the probability of high peak leakage can be minimized.

Figure 7:
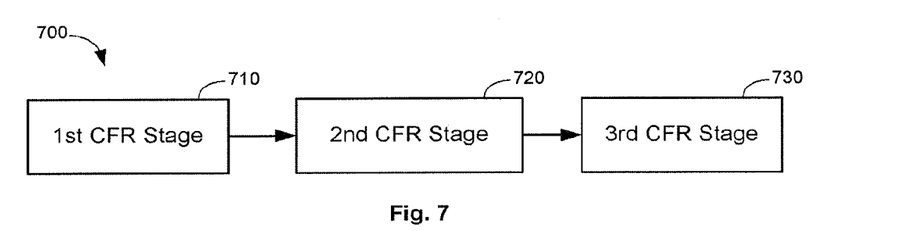
FIG. 7 is a block diagram of a multi-stage CFR circuit according to an embodiment of the present invention.

FIG. 7 is a block diagram of a multi-stage CFR circuit 700 according to an embodiment of the present invention. As shown in FIG. 7, the multi-stage CFR circuit includes at least: a first crest factor reduction stage 710 with a first filter length; a second crest factor reduction stage 720 with a second filter length shorter than the first filter length; and a third crest factor reduction stage 730 with a third filter length shorter than the second filter length. Here, at least one of the first, second and third crest factor reduction stages is formed by the CFR device according to the present invention. Any other crest factor reduction stage than the first crest factor reduction stage can be formed by a NS-CFR device. It can be appreciated by those skilled in the art that the number of stages is not limited to three; more or less stages can be implemented as appropriate.

In a non-limiting example, in a three-stage CFR circuit, the first CFR stage is a PC-CFR stage with a long filter length. Its processing ability is relatively low but causes very low ACLR. It can reduce high peaks to a small value. The majority of the power of the peaks is cancelled at this stage. The second CFR stage is a PC-CFR stage with a shorter filter length but more PGUs than the first CFR stage. It reduces most of peaks to a small value. Most of the power of the peaks is cancelled at this stage. After two stages, the power of the peaks is very low and most of the peaks have very small values. The third CFR stage is an NS-CFR stage with even shorter filter length and it will cancel all the remaining peaks.

With the above multi-stage CFR circuit, each stage has a different filter length and has a different role from the other stages. The advantages of the NS-CFR and PC-CFR algorithms can be combined with high efficiency and low complexity.

Figure 8A:
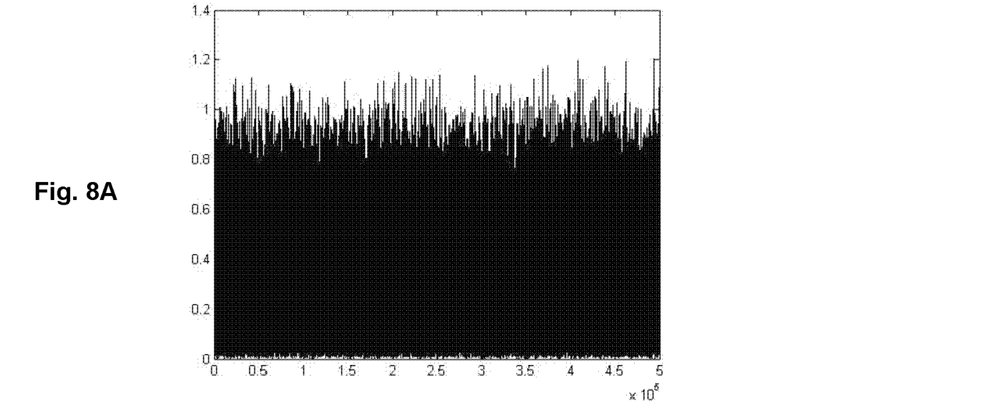
FIGS. 8A-8C are schematic diagrams showing the signal input to each of the three stages of the CFR circuit shown in FIG. 7, with the original signal having a PAPR of 9.6 dB.
Figure 8B:
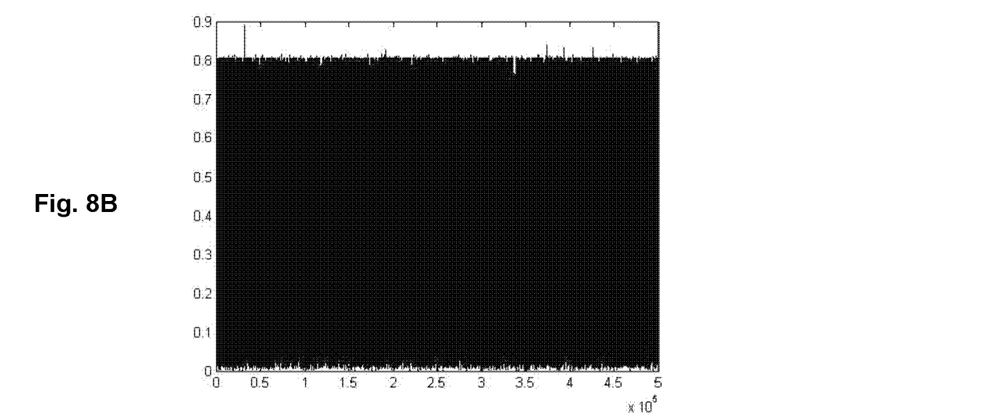
Figure 8C:
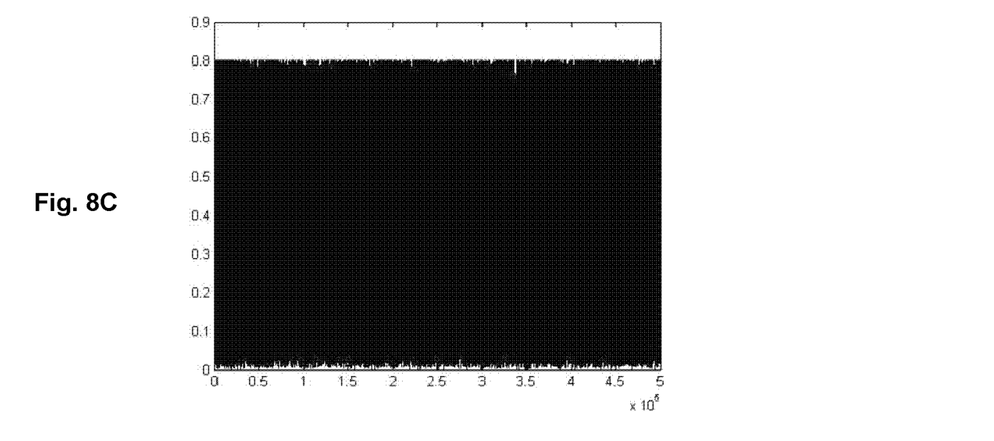

FIGS. 8A-8C are schematic diagrams showing the signal input to each of the three stages of the CFR circuit shown in FIG. 7. In FIGS. 8A-8C, the original signal has a PAPR of 9.6 dB and the target PAPR is set to 7.1 dB. The horizontal axis represents sampling points and the vertical axis represents the normalized amplitude of the signal. It can be seen that most of high peaks are cancelled by the first stage and most of power of peaks is cancelled after the first two stages. The CFR device and/or circuit can be applied in base stations, remote radio units, user equipments and any other entity where PAPR suppression is desired.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:

1. A device of crest factor reduction for a multi-carrier signal comprising:
    a peak detector adapted to receive a sampled representation of the multi-carrier signal, detect a peak from the sampled representation and obtain a value and a time domain location of a cancellation peak for cancelling the peak;
    a plurality of peak cancellation signal generators each corresponding to a carrier of the multi-carrier signal and adapted to generate a peak cancellation signal within a frequency band of its corresponding carrier based on the value and time domain location of the cancellation peak, wherein each of the plurality of peak cancellation signal generators comprises:
        an allocator adapted to allocate the cancellation peak to a peak generation unit;
        a plurality of peak generation units each adapted to, if allocated with the cancellation peak, adjust a phase of the cancellation peak to obtain a phase adjusted value of the cancellation peak and generate an intermediary signal based on the phase adjusted value and the time domain location of the cancellation peak;
        an adder adapted to sum up intermediary signals generated by the plurality of peak generation units to obtain a sum signal; and
        a mixer adapted to up-convert the sum signal to the carrier corresponding to the peak cancellation signal generator to generate the peak cancellation signal, wherein the phase of the cancellation peak is adjusted to compensate for a phase offset introduced by the mixer; and
    a subtractor adapted to subtract the peak cancellation signals from the sampled representation after being delayed.

2. The device of claim 1, wherein the sampled representation is obtained by sampling the multi-carrier signal at a sampling frequency.

3. The device of claim 1, wherein the sampled representation is obtained by sampling the multi-carrier signal at a sampling frequency and over-sampling the sampled signal at an over-sampling frequency.

4. The device of claim 2, wherein the sampling frequency is $F_s$ and each of the plurality of peak generation units operates at a frequency of $F_s/M$, where M is positive integer dependent on the bandwidth of the carrier corresponding to the peak cancellation signal generator.

5. The device of claim 4, wherein each of the plurality of peak cancellation signal generators further comprises:
    an up-sampler adapted to up-sample the sum signal to $F_s$, wherein the mixer is adapted to up-covert up-convert the up-sampled sum signal to the carrier corresponding to the peak cancellation signal generator to generate the peak cancellation signal.

6. A device of crest factor reduction, comprising:
    a peak detector adapted to receive a sampled representation of a signal, detect a peak from the sampled representation and obtain a value and a time domain location of a cancellation peak for cancelling the peak, wherein the sampled representation is obtained by sampling the signal at a sampling frequency and over-sampling the sampled signal at an over-sampling frequency;
    an allocator adapted to allocate the cancellation peak to a peak generation unit;
    a plurality of peak generation units each adapted to, if allocated with the cancellation peak, adjust a phase of the cancellation peak to obtain a phase adjusted value of the cancellation peak and generate an intermediary signal based on the phase adjusted value and the time domain location of the cancellation peak;
    an adder adapted to sum up intermediary signals generated by the plurality of peak generation units to obtain a sum signal;
    a mixer adapted to up-convert the sum signal to a carrier frequency of the signal to generate a peak cancellation signal; and
    a subtractor adapted to subtract the peak cancellation signal from the sampled representation after being delayed,
    wherein the phase of the cancellation peak is adjusted to compensate for a phase offset introduced by the mixer.

7. The device of claim 6, wherein the sampling frequency is $F_s$ and each of the plurality of peak generation units operates at a frequency of $F_s/M$, where M is positive integer dependent on the bandwidth of the signal.

8. The device of claim 6, further comprising:
an up-sampler adapted to up-sample the sum signal $F_s$, wherein the mixer is adapted to up-convert the up-sampled sum signal to generate the peak cancellation signal.

9. The device of claim 6, wherein the peak detector is adapted to detect as the peak any sample from the sampled representation which has a magnitude larger than a first threshold while giving priority to any sample having a magnitude larger than a second threshold, the second threshold being larger than the first threshold.

10. The device of claim 9, wherein the peak detector comprises:
a resource calculation unit adapted to calculate a resource occupation state of each of the plurality of peak generation units;
a peak detection unit adapted to detect, from the sampled representation, samples each having a magnitude larger than the first threshold as a set of candidate peaks;
a high peak extraction unit adapted to extract, from the set of candidate peaks, a high peak having a magnitude larger than the second threshold and determine the high peak as a peak to be canceled if the resource occupation state of at least one of the plurality of peak generation units indicates that the at least one peak generation unit is currently idle;
a delay unit adapted to delay the high peak determined as a peak to be canceled by a time length required for processing a peak;
a peak modification and delay unit adapted to remove the high peak determined as a peak to be canceled from the set of candidate peaks to obtain a set of low peaks and delay the set of low peaks by the time length; and
a low peak extraction unit adapted to extract a low peak from the set of low peaks in a temporal order, determine the low peak as a peak to be canceled if the resource occupation state of at least one of the plurality of peak generation units indicates that the at least one peak generation unit has been idle for at least the time length, and output a value and a time domain location of each peak determined as a peak to be canceled by both the high and low peak extraction units.

11. A multi-stage crest factor reduction circuit, comprising at least:
a first crest factor reduction stage with a first filter length;
a second crest factor reduction stage with a second filter length shorter than the first filter length; and
a third crest factor reduction stage with a third filter length shorter than the second filter length;
wherein at least one of the first, second and third crest factor reduction stages is formed by a device of crest factor reduction for a multi-carrier signal, the device of crest factor reduction for a multi-carrier signal comprising:
a peak detector adapted to receive a sampled representation of the multi-carrier signal, detect a peak from the sampled representation and obtain a value and a time domain location of a cancellation peak for cancelling the peak;
a plurality of peak cancellation signal generators each corresponding to a carrier of the multi-carrier signal and adapted to generate a peak cancellation signal within a frequency band of its corresponding carrier based on the value and time domain location of the cancellation peak, wherein each of the plurality of peak cancellation signal generators comprises:
an allocator adapted to allocate the cancellation peak to a peak generation unit;
a plurality of peak generation units each adapted to, if allocated with the cancellation peak, adjust a phase of the cancellation peak to obtain a phase adjusted value of the cancellation peak and generate an intermediary signal based on the phase adjusted value and the time domain location of the cancellation peak;
an adder adapted to sum up intermediary signals generated by the plurality of peak generation units to obtain a sum signal; and
a mixer adapted to up-convert the sum signal to the carrier corresponding to the peak cancellation signal generator to generate the peak cancellation signal, wherein the phase of the cancellation peak is adjusted to compensate for a phase offset introduced by the mixer; and
a subtractor adapted to subtract the peak cancellation signals from the sampled representation after being delayed.

12. The multi-stage crest factor reduction circuit of claim 11, wherein any other crest factor reduction stage than the first crest factor reduction stage is formed by a noise shaping crest factor reduction device.

13. A peak detector, which detects one or more peaks to be canceled by a plurality of peak generation units, comprising:
a resource calculation unit adapted to calculate a resource occupation state of each of the plurality of peak generation units;
a peak detection unit adapted to detect, from a sampled representation of a signal, samples each having a magnitude larger than a first threshold as a set of candidate peaks;
a high peak extraction unit adapted to extract, from the set of candidate peaks, a high peak having a magnitude larger than a second threshold, the second threshold being larger than the first threshold, and determine the high peak as a peak to be canceled if the resource occupation state of at least one of the plurality of peak generation units indicates that the at least one peak generation unit is currently idle;
a delay unit adapted to delay the high peak determined as a peak to be canceled by a time length required for processing a peak;
a peak modification and delay unit adapted to remove the high peak determined as a peak to be canceled from the set of candidate peaks to obtain a set of low peaks and delay the set of low peaks by the time length; and
a low peak extraction unit adapted to extract a low peak from the set of low peaks in a temporal order, determine the low peak as a peak to be canceled if the resource occupation state of at least one of the plurality of peak generation units indicates that the at least one peak generation unit has been idle for at least the time length, and output a value and a time domain location of each peak determined as a peak to be canceled by both the high and low peak extraction units.

* * * * *